(12) United States Patent
Seibold

(10) Patent No.: US 6,240,661 B1
(45) Date of Patent: Jun. 5, 2001

(54) METHOD AND APPARATUS FOR REPLACING INTERNAL SPLINES IN A POWER MINING SHOVEL DRIVE TRAIN

(75) Inventor: John C. Seibold, West Allis, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 09/038,559

(22) Filed: Mar. 11, 1998

(51) Int. Cl.[7] .......................... B62D 55/00; B62D 55/06
(52) U.S. Cl. .................................. 37/395; 180/9.1
(58) Field of Search ........................ 37/394, 395, 397, 37/466; 180/9.1, 6.7; 305/9; 188/52

(56) References Cited

U.S. PATENT DOCUMENTS 3,580,345 * 5/1971 Brown ....................................... 305/9
3,994,352 * 11/1976 Siorek .................................. 180/9.2 R

* cited by examiner

*Primary Examiner*—Robert E. Pezzuto
(74) *Attorney, Agent, or Firm*—David R. Price; James Earl Lowe, Jr.

(57) ABSTRACT

A power mining shovel including a drive train drivingly connected to ground-engaging device, the drive train including a drive train shaft, and a disc brake apparatus operably connected to the drive train shaft for selectively preventing rotation of the drive train shaft, the disc brake apparatus including a brake hub mounted on the drive train shaft for rotation therewith, the brake hub including an outer member rotatable about the axis, the outer member including an inner wall defining a generally cylindrical bore centered on the axis, the inner wall having therein a plurality of recesses, the brake hub also including an inner member rotatable about the axis, the inner member including internal splines engaging the drive train shaft to prevent relative rotation of the inner member and the drive train shaft, the inner member being located in the bore of the outer member and having a generally cylindrical outer wall, the outer wall having therein a like plurality of recesses, each of the recesses in the outer wall of the inner member being aligned with a respective one of the recesses in the inner wall of the outer member so as to provide a plurality of spaces each defined in part by the outer member and in part by the inner member, and the brake hub also including a like plurality of torque transmitting members, each of the torque transmitting members being located in a respective one of the spaces such that the torque transmitting members prevent relative rotation of the inner and outer members.

18 Claims, 5 Drawing Sheets

Fig. 6

METHOD AND APPARATUS FOR REPLACING INTERNAL SPLINES IN A POWER MINING SHOVEL DRIVE TRAIN

BACKGROUND OF THE INVENTION

The invention relates to power mining shovels, such as those used for surface mining. The invention also relates to the splined connection of a rotating shaft and a member that either drives or is driven by the shaft.

A typical power mining shovel includes a revolvable upper frame supported on a mobile carbody. The manner in which the carbody is supported is described below. A fixed boom extends upwardly and outwardly from the frame, and a dipper handle is mounted on the boom for movement for pivotal and translational (non-pivotal) movement relative to the boom. A dipper is fixed to the end of the dipper handle. The outer end of the boom has thereon a sheave, and a hoist cable or rope extends over the sheave and is fastened to the dipper.

The carbody is supported by ground-engaging means, such as crawler track assemblies. A typical crawler track assembly includes a series of shoes that are pivotally pinned together and that have shoe drive lugs which are engaged and pushed by a rotating drive tumbler. The drive tumbler is mounted on a rotating tumbler or drive shaft and has a sprocket-like shape including tumbler lugs that extend radially outward and engage the shoe drive lugs as the tumbler rotates, thereby driving the shoes and moving the crawler track around its endless path. Each crawler track assembly is driven by a motor via a drive train.

U.S. patent application Ser. No. 08/922,838, which was filed Aug. 26, 1997, which is assigned to the assignee hereof, and which is incorporated herein by reference, discloses a disc brake apparatus for such a drive train. The disc brake apparatus includes a brake hub having internal splines engaging external splines on a transmission input shaft. Engagement of the disc brake apparatus prevents rotation of the brake hub which in turn prevents rotation of the input shaft, thereby braking the entire drive train. Obviously, a substantial amount of torque is transmitted by the splines on the brake hub. This can cause these splines to wear out before other components of the drive train.

It is known to "rebuild" the splines by machining the brake hub and providing an insert having thereon new splines. FIG. 1 illustrates a prior art insert 10 in a brake hub 14. The insert 10 has a flange 18 through which screws 22 (only one is shown) and dowels or pins 26 (only one is shown) extend to secure the insert 10 to the hub 14.

SUMMARY OF THE INVENTION

One disadvantage of this prior art arrangement is that the load distribution between the insert and the hub is uneven because all of the load is transmitted through the insert flange. Also, machining of the prior art insert is relatively complicated and expensive.

The invention provides an improved spline insert and an improved method of rebuilding a brake hub. Preferably, the insert and the hub are connected by a plurality of pins extending into holes spaced around the junction of the insert and the hub. In other words, the holes overlap both the insert and the hub, so that one side of each pin engages the insert and the other side of each pin engages the hub. The holes extend along most of the width (the distance in the direction of the axis of rotation) of the insert. The load is distributed along the entire length of the pins and is not concentrated in one area of the insert. The insert flange is needed only to locate the brake hub. The flange could be eliminated entirely in other embodiments of the invention in which another mechanism is used to located the hub.

Because the pins engage the insert along most of the width of the insert, the load distribution is more even.

Machining is substantially reduced by eliminating the tapped holes and reducing the flange size. The flange size can be reduced because the pins do not extend through the flange.

Because the pins do not extend through the flange, the outside diameter of the insert can be greater, resulting in a more robust construction.

The pins "captivate" the brake hub, thereby eliminating the need for screws.

The pins can be ground or machined flush with the end of the insert, adjusting for any machining errors.

Other features and advantages of the invention will become apparent to those skilled in the art upon review of the following detailed description, claims and drawings.

DESCRIPTION OF THE DRAWINGS

FIG. 6 is an enlarged portion of FIG. 4.

Figure 5:
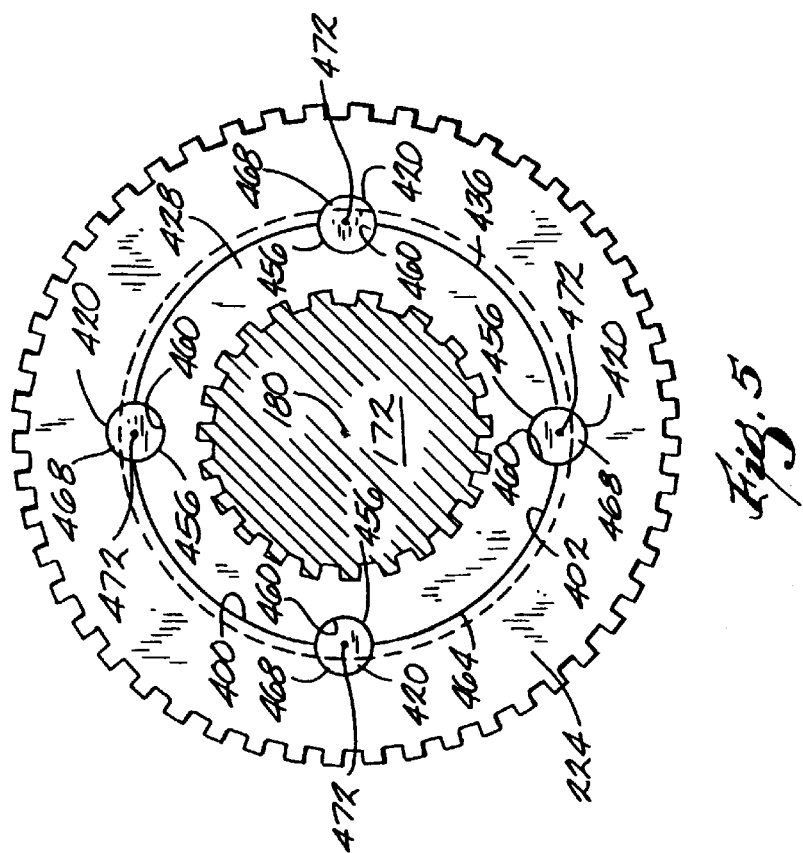
FIG. 5 is a view taken along line 5—5 in FIG. 4.
Figure 1:
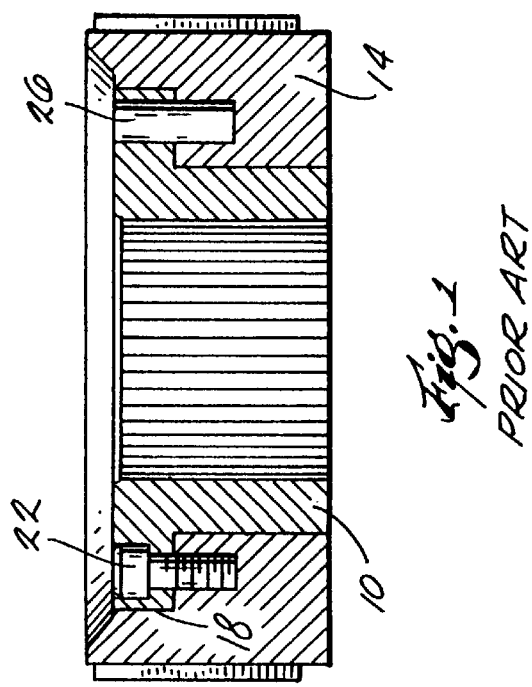
FIG. 1 is a sectional view of a prior art brake hub with a conventional spline insert.
Figure 2:
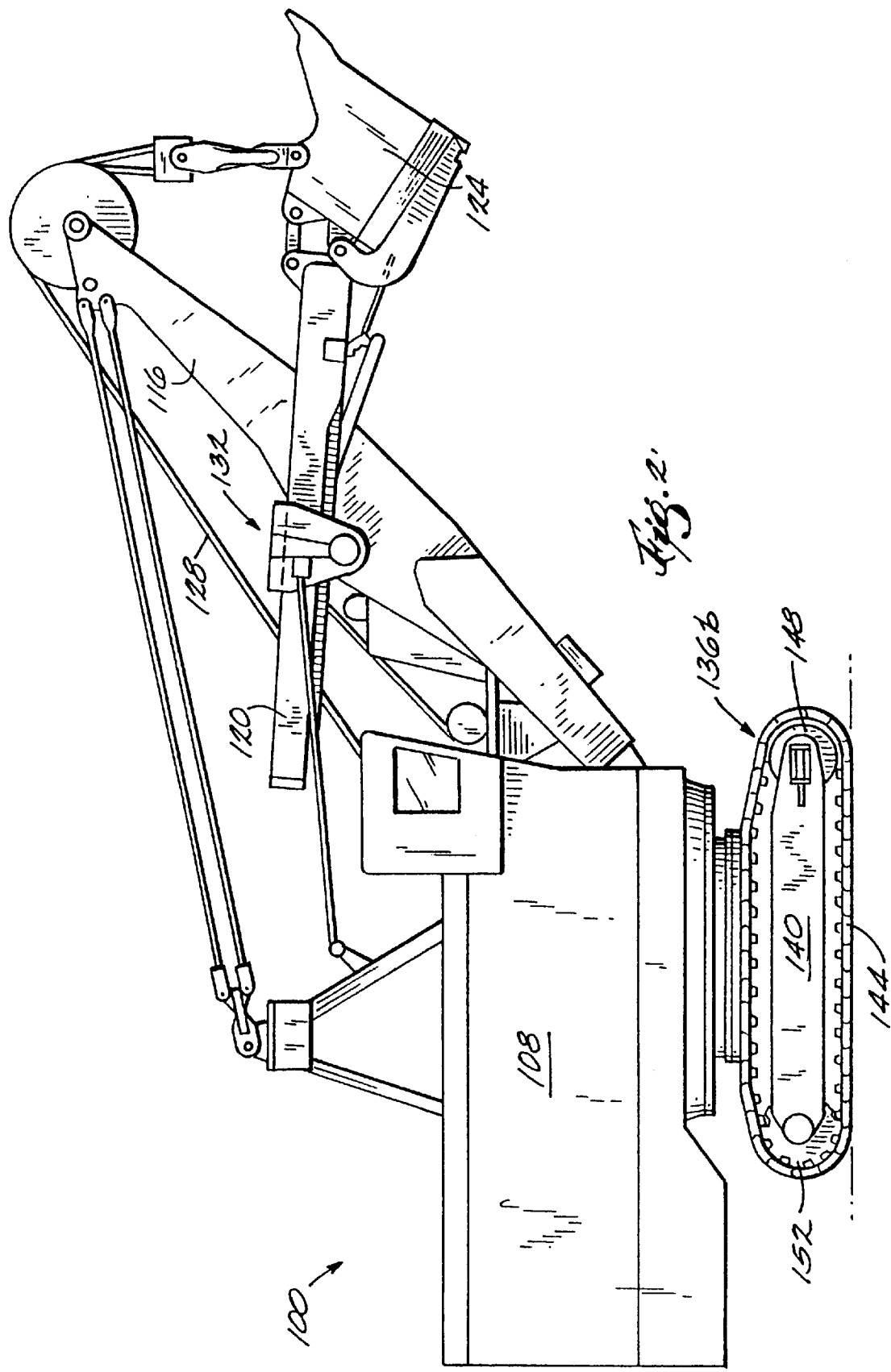
FIG. 2 is a side elevational view of a power mining shovel embodying the invention and including an improved spline insert.
Figure 3:
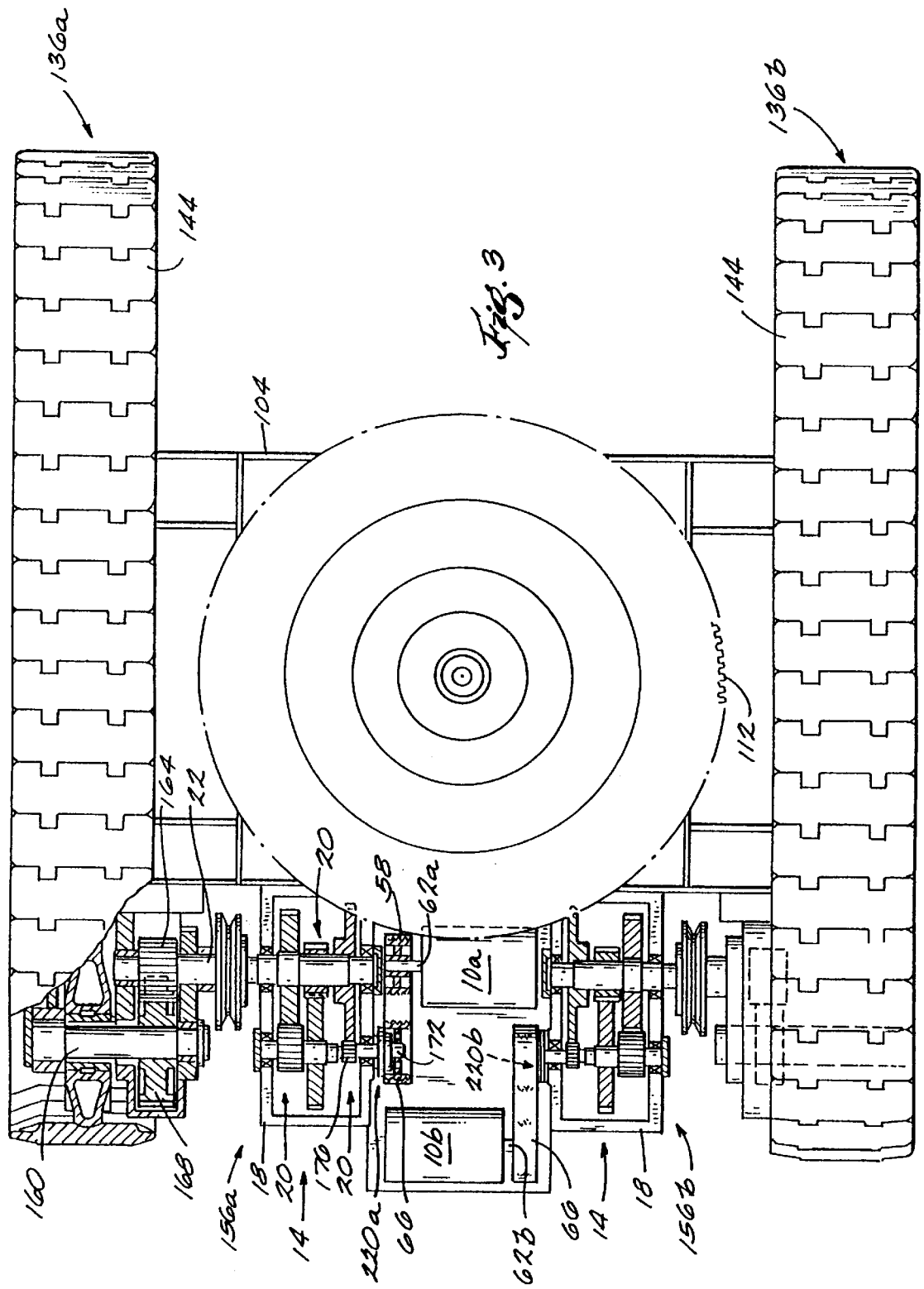
FIG. 3 is a plan view, partially in cross section, of the lower portion of the shovel shown in FIG. 2.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A power mining shovel 100 embodying the invention is illustrated in FIGS. 2–5 of the drawings. While the preferred embodiment of the invention is a power mining shovel, it should be understood that the invention is applicable to other types of mining equipment. The shovel 100 comprises a body or carbody 104 (FIG. 3), and an upper frame 108 (FIG. 2) mounted on the carbody 104 for rotation relative thereto about a generally vertical axis. In the illustrated construction, the upper frame 108 rotates about a ring gear 112 (FIG. 3) on the carbody 104. The shovel 100 also comprises (see FIG. 2) a boom 116 mounted on the upper frame 108, and a dipper handle 120 mounted on the boom 116 for pivotal movement relative thereto about a generally horizontal axis, and for translational movement relative thereto. An earth moving device or dipper 124 is mounted on the end of the dipper handle 120. A hoist mechanism including a hoist rope 128 pivots the dipper handle 120 relative to the boom 116, and a crowd mechanism 132 moves the dipper handle 120 translationally relative to the boom 116.

The shovel 100 also comprises ground-engaging means supporting the carbody 104 for movement over the ground. In the illustrated construction, the ground-engaging means include (see FIGS. 2 and 3) crawler track assemblies 136a and 136b. In alternative embodiments of the invention, the ground-engaging means could includes other means such as wheels. The crawler track assemblies 136a and 136b are mirror images of each other, and common elements have been given the same reference numerals. Each of the crawler track assemblies 136 includes (see FIG. 2) a crawler frame 140 fixed to the carbody 104, a crawler shoe assembly 144 movable relative to the crawler frame 140, an idler tumbler 148 supporting the crawler shoe assembly 144 relative to the crawler frame 140, and a drive tumbler 152 for moving the crawler shoe assembly relative to the crawler frame. Motors 10a and 10b (FIG. 3) are mounted on the carbody 104 and have respective output shafts 62a and 62b. The motors 10a and 10b are drivingly connected to the crawler track assemblies 136a and 136b, respectively, by drive trains 156a and 156b. The drive trains are substantially identical, and only the drive train 156a will be described in detail. Common elements have been given the same reference numerals.

Figure 4:
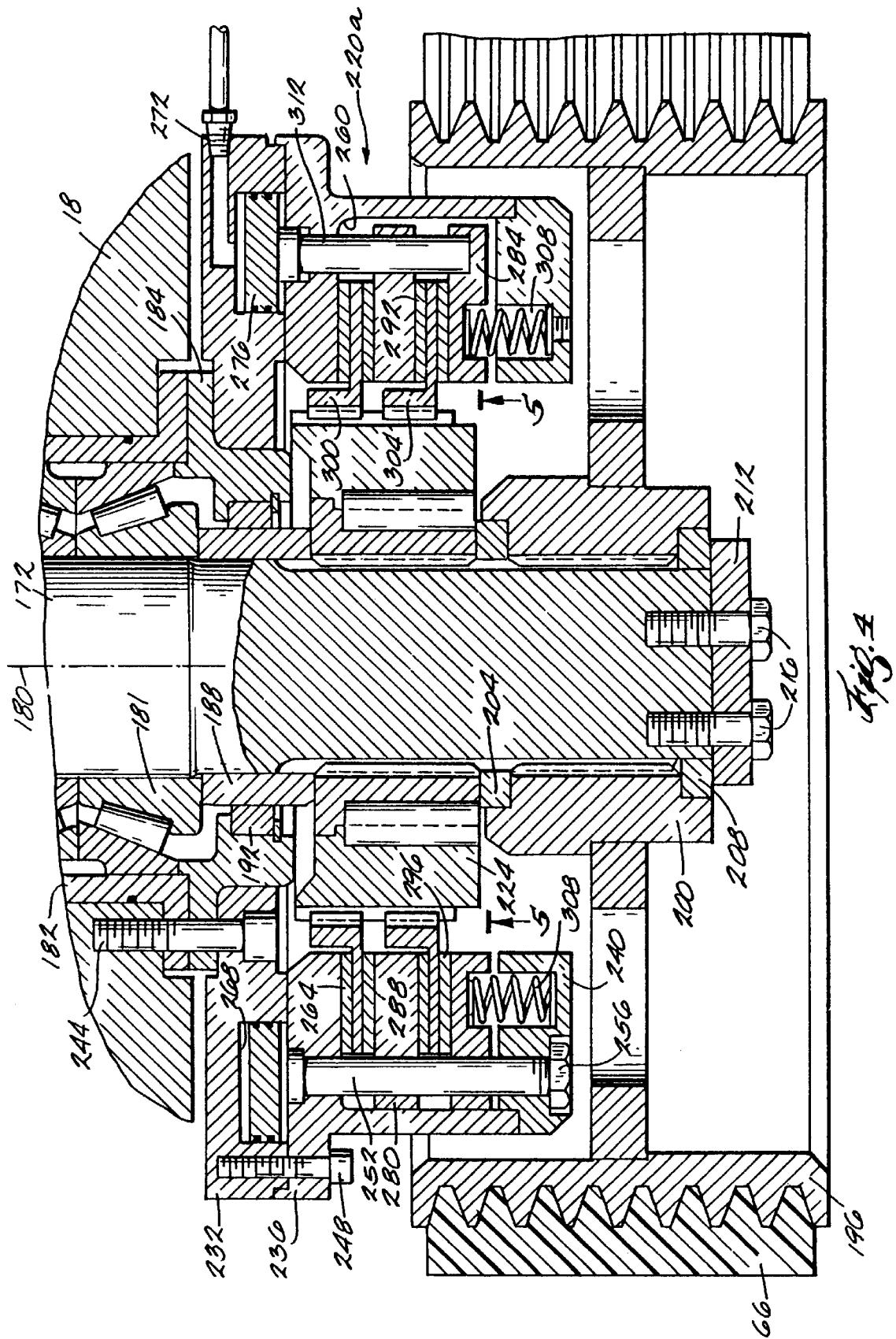
FIG. 4 is an enlarged portion of FIG. 3 showing the improved spline insert in cross section.

The drive train 156a includes a tumbler shaft 160 drivingly connected to the drive tumbler 152. The drive train 156a also includes a propel transmission 14 including a transmission housing 18 fixed to the carbody 104, and three sets of reduction gears 20. A transmission output shaft 22 is supported by the transmission housing 18 and is drivingly connected to the tumbler shaft 160 via a pinion 164 on the output shaft 22 and a gear 168 on the tumbler shaft 160. A transmission input shaft 172 is drivingly connected to the propel transmission 14. The shaft 172 has thereon a pinion 176 (FIG. 3) that is part of the first set of reduction gears 20. The shaft 172 has external splines and a longitudinal axis of rotation 180 (FIG. 4). A bearing 181, a bearing capsule 182 and a bearing retainer 184 are fixed to the transmission housing 18 in a manner described below. A spacer 188 surrounds the shaft 172 inside the bearing retainer 184, and a seal 192 extends between the spacer 188 and the bearing retainer 184. An input sheave 196 is mounted on the input shaft 172. The sheave 196 has a hub 200 with internal splines engaging the splines on the shaft 172 so that the sheave 196 is drivingly connected to the shaft 172. Inner and outer sheave rings 204 and 208, respectively, surround the shaft 172 inside the hub 200. An end plate 212 and screws 216 secure the sheave 196 on the shaft 172. The outer sheave ring 208 spaces the sheave hub 200 from the end plate 212. The belt 66 drivingly connects the output sheave 58 to the input sheave 196.

Disc brake apparatus 220a and 220b (FIG. 3) are operably connected to the drive trains 156a and 156b, respectively. The brake apparatus are substantially identical, and only the apparatus 220a will be described in detail. Common elements have been given the same reference numerals.

Although the brake apparatus 220a is preferably connected to the input shaft 172, it should be understood that the brake can be located elsewhere in the drive train. The brake apparatus 220a includes (see FIG. 4) a brake hub 224 mounted on the transmission input shaft 172 for rotation therewith. Although not shown in the drawings, the brake hub 224 is initially a unitary, one-piece member with integral internal splines engaging the splines on the shaft 172. The hub 224 shown in the drawings has already been "rebuilt" after the original splines have worn out. The hub 224 has external splines, the reason for which is explained below. The spacer 188 spaces the hub 224 from the bearing 181, and the inner sheave ring 204 spaces the brake hub 224 from the sheave hub 200.

Figure 6:
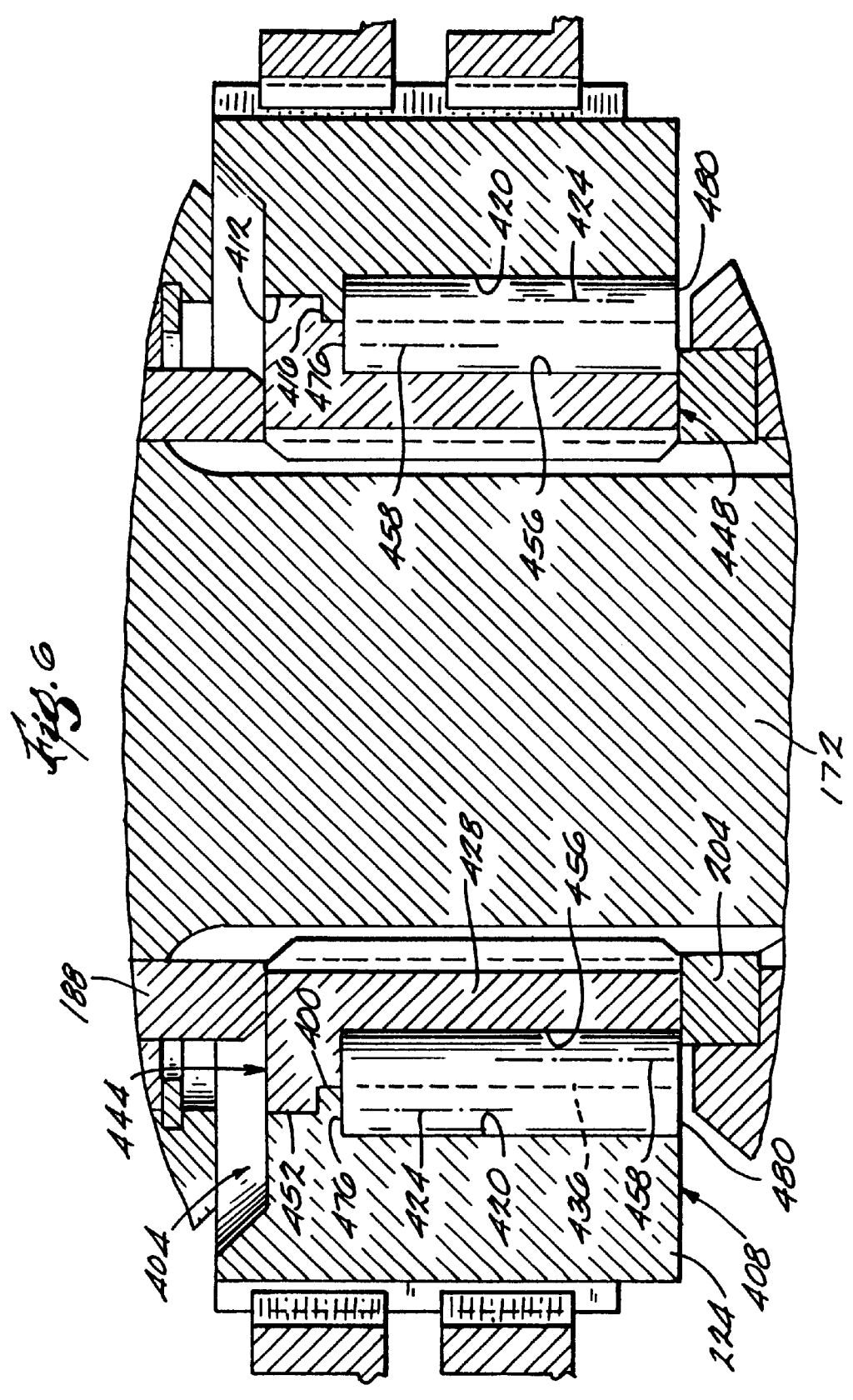

The following is a description of how the brake hub 224 has been rebuilt. The original hub 224 has been machined (see FIGS. 5 and 6) to remove the worn-out splines and to provide the hub 224 with an inner wall 400 defining a generally cylindrical bore 402 (FIG. 5) centered on the axis 180. The machined hub 224 has opposite ends or end walls 404 and 408 spaced in the direction of the axis 180. The ends 404 and 408 define planes perpendicular to the axis 180. A counterbore 412 in the hub end 404 provides the inner wall with a shoulder 416 perpendicular to the axis 180. The inner wall 400 has therein a plurality of recesses 420, which are preferably semi-cylindrical and have respective longitudinal axes 424 (two are shown in FIG. 6) parallel to the axis 180, so that the recesses 420 are elongated in the direction of the axis 180. The recesses 420 extend from the end 408 of the hub 224. The inner wall 400 preferably has four recesses 420, although more or fewer can be employed.

The brake hub 224 has been provided with an inner member 428 rotatable about the axis 180. The inner member 428 includes internal splines engaging the input shaft 172 to prevent relative rotation of the inner member 428 and the input shaft 172. The inner member 428 is located in the bore 402 of the hub 224, such that the machined hub 224 can also be considered an outer member 432 of the brake apparatus. The inner member 428 has a generally cylindrical outer wall 436 facing the inner wall 400 of the outer member 432. The inner member 428 has opposite ends or end walls 444 and 448 spaced in the direction of the axis 180. The ends 444 and 448 define planes perpendicular to the axis 180 and are co-planar with the ends 404 and 408, respectively, of the outer member 432. The end 444 of the inner member 428 includes an annular flange 452 engaging the shoulder 416 of the outer member 432 so as to prevent relative axial movement of the inner and outer members 428 and 432 in one direction. As shown in FIG. 4, the flange 452 prevents movement of the outer member 432 upwardly relative to the inner member 428. The outer wall 436 has therein a plurality of recesses 456, the number of recesses 456 being equal to the number of recesses 420. The recesses 456 are preferably semi-cylindrical and have respective longitudinal axes 458 parallel to the axis 180, so that the recesses 456 are elongated in the direction of the axis 180. Each of the recesses 456 is aligned with a respective one of the recesses 420 so as to provide a plurality of spaces or bores 460 each defined in part by the outer member 432 and in part by the inner member 428. The bores 460 are preferably cylindrical blind bores. Viewed another way, the walls of the inner and outer members 428 and 432 define a generally cylindrical junction 464 (see FIG. 5) between the inner and outer members 428 and 432, and the bores 460 are holes spaced around the junction 464 of the inner and outer members 428 and 432. The bores 460 can be machined either by machining the inner and outer members 428 and 432 together or by machining the recesses in the inner and outer members 428 and 432 separately.

The brake hub 224 has also been provided with a plurality of torque transmitting members or pins 468, the number of pins 468 being equal to the number of bores 460. The pins 468 are preferably cylindrical and have outer diameters substantially equal to the inner diameters of the bores 460. Each of the pins 468 is located in a respective one of the bores 460 such that the pins 468 have respective longitudinal axes 472 parallel to the axis 180. Approximately one-half of each pin 468 extends into the associated recess in the inner member 428, and approximately one-half of each pin 468 extends into the associated recess in the outer member 432. Each pin 468 has an inner end 476 spaced from the flange 452 in the direction of the axis 180, and each pin 468 also has an outer end 480 substantially flush with the ends 408 and 448 of the inner and outer members 428 and 432. The pins 468 prevent relative rotation of the inner and outer members 428 and 432.

The sheave ring or ring member 204 engages both the end 448 of the inner member 428 and the outer ends 480 of the pins 468, thereby preventing movement of the pins 468 downwardly as shown in FIG. 4. This in turn prevents downward movement of the outer member 432 relative to the inner member 428. The pins 468 thus "captivate" the outer member 432.

The brake apparatus 220a also includes means for selectively preventing rotation of the outer member 432 and thereby preventing, through the pins 468 and the inner member 428, rotation of the input shaft 172. Preferably, this means, which is described below, is identical to the means described in above-mentioned U.S. patent application Ser. No. 08/922,838 for preventing rotation of the brake hub 224. The following description is also found in application Ser. No. 08/922,838.

A brake housing 228 surrounds the brake hub 224 and is fixed to the transmission housing 18 as described below. In the illustrated construction, the brake housing 228 is made of three parts, an inner part 232, a middle part 236, and an outer part 240. The inner part 232 is fixed to the transmission housing 18 by screws 244 that also fix the bearing retainer 184 and the bearing capsule 182 to the housing 18 and that replace the prior art screws 42. The middle part 236 is fixed to the inner part 232 by screws 248. The outer part 240 is fixed to the middle part 236 by bolts 252 and nuts 256. The middle and outer parts 236 and 240 define therebetween an annular space 260 through which the bolts 252 extend. The middle part 236 has thereon an annular brake pad 264 facing outwardly (downward in FIG. 4) and toward the space 260. The inner and middle parts 232 and 236 of the brake housing 228 define an annular cylinder cavity 268 centered on the shaft axis 180. Diametrically spaced upper and lower air ports 272 in the inner part 232 communicate with the cavity 268.

The brake apparatus 220a also includes a ring-shaped piston 276 slidably housed in the cylinder cavity 268. The piston 276 has opposite pressure and rod sides (upper and lower sides in FIG. 4). Inner and outer floating rings 280 and 284, respectively, are located in the space 260 and have therein bores through which the bolts 252 extend so that the rings 280 and 284 are fixed against rotation relative to the brake housing 228 and are movable relative to the brake housing 228 in the direction of the axis 180 (top-to-bottom in FIG. 4). The inner ring 280 has thereon an annular brake pad 288 facing inwardly and toward the brake pad 264, and an annular brake pad 292 facing outwardly and toward the outer ring 284. The outer ring 284 has thereon an annular brake pad 296 facing inwardly and toward the brake pad 292.

The brake apparatus 220a also includes inner and outer brake discs 300 and 304, respectively. The discs 300 and 304 have internal splines engaging the splines on the brake hub 224 so that the discs are movable relative to the brake housing 228 in the direction of the axis 180 (top-to-bottom in FIG. 4) and are fixed against rotation relative to the brake hub 224. The inner disc 300 extends between the brake pad 264 on the housing 228 and the brake pad 288 on the inner ring 280, and the outer disc 304 extends between the brake pad 292 on the ring 280 and the brake pad 296 on the ring 284. In other words, the floating rings 280 and 284 and the brake discs 300 and 304 are in an alternating arrangement. A plurality of springs 308 extend between the outer part 240 and the outer ring 284 and bias the floating rings 280 and 284 so as to squeeze the discs 300 and 304 between the brake pads to prevent rotation of the discs 300 and 304. This prevents rotation of the brake hub 224 and the transmission input shaft 172 relative to the brake housing 228, thereby braking the entire drive train 156a. The brake apparatus 220a is thus spring-set, i.e., the springs 308 set the brake in the absence of a stronger opposing force that releases the brake.

Such an opposing force is selectively provided by a plurality of piston rods 312 (only one is shown in FIG. 4) extending between the rod side of the ring piston 276 and the outer floating ring 284 such that the application of pressure to the pressure side of the ring piston 276 (the top side in FIG. 4) moves the ring piston 276, the piston rods 312 and the outer floating ring 284 against the force of the springs 308 so that the discs 300 and 304, the brake hub 224 and the transmission input shaft 172 are free to rotate relative to the brake housing 228. The piston rods 312 extend through bores in the inner ring 280 and into blind bores in the outer ring 284. The inner ring 280 is free to slide along the piston rods 312. The pneumatic system is connected to the air ports 272 and thus to the cavity 268 for selectively applying pressure to the pressure side of the ring piston 276, thereby releasing the disc brake apparatus.

Various features of the invention are set forth in the following claims:

1. A mining apparatus comprising
    a body,
    an earth moving device mounted on the body for movement relative thereto,
    ground-engaging means supporting the body for movement over the ground,
    a motor which is mounted on the body and which has an output shaft,
    a drive train drivingly connecting the motor output shaft to the ground-engaging means, the drive train including a drive train shaft which is drivingly connected to the ground-engaging means and which has an axis of rotation, and
    a disc brake apparatus operably connected to the drive train shaft for selectively preventing rotation of the drive train shaft, the disc brake apparatus including a brake hub mounted on the drive train shaft for rotation therewith, the brake hub including an outer member rotatable about the axis, the outer member including an inner wall defining a generally cylindrical bore centered on the axis, the inner wall having therein a plurality of recesses, the brake hub also including an inner member rotatable about the axis, the inner member including internal splines engaging the drive train shaft to prevent relative rotation of the inner member and the drive train shaft, the inner member being located in the bore of the outer member and having a generally cylindrical outer wall, the outer wall having therein a like plurality of recesses, each of the recesses in the outer wall of the inner member being aligned with a respective one of the recesses in the inner wall of the outer member so as to provide a plurality of spaces each defined in part by the outer member and in part by the inner member, and the brake hub also including a like plurality of torque transmitting members, each of the torque transmitting members being located in a respective one of the spaces such that the torque transmitting members prevent relative rotation of the inner and outer members, and the brake apparatus also including means for selectively preventing rotation of the outer member and thereby preventing, through the torque transmitting members and the inner member, rotation of the drive train shaft.

2. An apparatus as set forth in claim 1 wherein the recesses in the inner and outer members are elongated in the direction of the axis.

3. An apparatus as set forth in claim 2 wherein the recesses in the inner and outer members are semi-cylindrical, and wherein the torque transmitting members are cylindrical and have respective longitudinal axes generally parallel to the axis of rotation.

4. An apparatus as set forth in claim 3 wherein approximately one-half of each torque transmitting member extends into the associated recess in the inner member and approximately one-half of each torque transmitting member extends into the associated recess in the outer member.

5. An apparatus as set forth in claim 1 wherein each of the inner and outer members has opposite first and second ends spaced in the direction of the axis, wherein the recesses in the outer member extend from the first end of the outer member, and wherein the recesses in the inner member extend from the first end of the inner member such that the spaces are bores extending from the first ends of the inner and outer members.

6. An apparatus as set forth in claim 5 wherein the spaces are blind bores.

7. An apparatus as set forth in claim 6 wherein the blind bores are cylindrical, and wherein the torque transmitting members are cylindrical and have respective outer ends substantially flush with the first ends of the inner and outer members.

8. An apparatus as set forth in claim 7 wherein the first ends of the inner and outer members and the outer ends of the torque transmitting members define a plane generally perpendicular to the axis.

9. An apparatus as set forth in claim 8 and further comprising a ring member surrounding the drive train shaft and engaging both the first end of the inner member and the outer ends of the torque transmitting members, whereby the torque transmitting members prevent movement of the outer member relative to the inner member in one axial direction.

10. An apparatus as set forth in claim 9 wherein the inner wall of the outer member includes a shoulder generally perpendicular to the axis, and wherein the inner member includes an annular flange engaging the shoulder so as to prevent movement of the outer member relative to the inner member in the other axial direction.

11. An apparatus as set forth in claim 1 wherein the inner wall of the outer member includes a shoulder generally perpendicular to the axis, and wherein the inner member includes an annular flange engaging the shoulder so as to prevent relative axial movement of the inner and outer members in one direction.

12. An apparatus as set forth in claim 11 wherein the torque transmitting members have respective inner ends nearest the flange and respective outer ends farthest from the flange, and wherein the inner ends of the torque transmitting members are spaced from the flange in the direction of the axis.

13. An apparatus as set forth in claim 11 wherein each of the inner and outer members has opposite first and second ends spaced in the direction of the axis, wherein the shoulder is defined by a counterbore in the second end of the outer member, and wherein the flange is located on the second end of the inner member.

14. An apparatus as set forth in claim 13 wherein the second ends of the inner and outer members define a plane generally perpendicular to the axis.

15. An apparatus as set forth in claim 1 wherein the ground-engaging means includes a crawler track assembly, the crawler track assembly including a crawler frame fixed to the body, a crawler shoe assembly movable relative to the crawler frame, and a drive tumbler for moving the crawler shoe assembly relative to the crawler frame, and wherein the shaft is drivingly connected to the drive tumbler.

16. An apparatus as set forth in claim 1 and further comprising an upper frame rotatably mounted on the body, a dipper handle mounted on the upper frame for pivotal movement relative thereto, wherein the earth moving device is a dipper mounted on the dipper handle, and wherein the apparatus further comprises a boom mounted on the upper frame, wherein the dipper handle is mounted on the boom for pivotal and translational movement relative thereto, and further comprising a hoist mechanism for pivoting the dipper handle relative to the boom, and a crowd mechanism for moving the dipper handle translationally relative to the boom.

17. A mining apparatus comprising a body, an earth moving device mounted on the body for movement relative thereto, ground-engaging means supporting the body for movement over the ground, a motor which is mounted on the body and which has an output shaft, a drive train drivingly connecting the motor output shaft to the ground-engaging means, the drive train including a drive train shaft which is drivingly connected to the ground-engaging means and which has an axis of rotation, and a disc brake apparatus operably connected to the drive train shaft for selectively preventing rotation of the drive train shaft, the disc brake apparatus including an outer member rotatable about the axis, the outer member including an inner wall defining a generally cylindrical bore centered on the axis, the brake apparatus also including an inner member rotatable about the axis, the inner member including internal splines engaging the drive train shaft to prevent relative rotation of the inner member and the drive train shaft, the inner member being located in the bore of the outer member and having a generally cylindrical outer wall facing the inner wall of the outer member to define a generally cylindrical junction between the inner and outer members, the inner and outer members being formed with a plurality of holes spaced around the junction of the inner and outer members, the holes extending generally parallel to the axis, the brake apparatus also including a like plurality of pins, each of the pins being located in a respective one of the holes such that the pins prevent relative rotation of the inner and outer members, and the brake apparatus also including means for selectively preventing rotation of the outer member and thereby preventing, through the pins and the inner member, rotation of the drive train shaft.

18. A method of retrofitting a mining apparatus comprising a body, an earth moving device mounted on the body for movement relative thereto, ground-engaging means supporting the body for movement over the ground, a motor which is mounted on the body and which has an output shaft, a drive train drivingly connecting the motor output shaft to the ground-engaging means, the drive train including a drive train shaft drivingly connected to the ground-engaging means, and a disc brake apparatus operably connected to the drive train shaft for selectively preventing rotation of the drive train shaft, the disc brake apparatus including a brake hub having internal splines engaging the drive train shaft to prevent relative rotation of the brake hub and the drive train shaft, and the brake apparatus also including means for selectively preventing rotation of the brake hub, the method comprising the steps of:

(a) machining the brake hub to remove the internal splines and to provide the brake hub with an inner wall defining a generally cylindrical bore, the inner wall having therein a plurality of recesses;

(b) replacing the brake hub in the brake apparatus;

(c) providing an inner member including internal splines engaging the drive train shaft to prevent relative rotation of the inner member and the drive train shaft, the inner member being located in the bore of the brake hub and having a generally cylindrical outer wall, the outer wall having therein a like plurality of recesses, each of the recesses in the outer wall of the inner member being aligned with a respective one of the recesses in the inner wall of the brake hub so as to provide a plurality of spaces each defined in part by the brake hub and in part by the inner member; and (d) providing a like plurality of torque transmitting members, each of the torque transmitting members being located in a respective one of the spaces such that the torque transmitting members prevent relative rotation of the inner member and the brake hub, such that operation of the brake apparatus to prevent rotation of the brake hub prevents, through the torque transmitting members and the inner member, rotation of the drive train shaft.

\* \* \* \* \*